United States Patent Office 2,907,775
Patented Oct. 6, 1959

2,907,775

N,N'-BIS(DIALKOXYPHOSPHINOTHIOYL)-p-BENZOQUINONE DIIMINE COMPOUNDS

Joseph E. Dunbar, Midland, Mich., assignor to The Dow Chemical Company, Midland, Mich., a corporation of Delaware No Drawing. Application July 21, 1958
Serial No. 749,585

4 Claims. (Cl. 260—396)

This invention is concerned with the N,N'-bis(dialkoxyphosphinothioyl) - p - benzoquinone diimine compounds corresponding to the formula

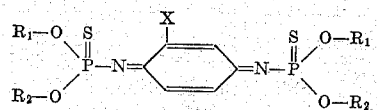

In this and succeeding formulae, $R_1$ and $R_2$ each represent lower alkyl and X represents hydrogen or chlorine. The expression lower alkyl is employed in the present specification and claims to refer to the alkyl radicals containing from 1 to 4 carbon atoms, inclusive. These new compounds are crystalline solids which are somewhat soluble in many organic solvents and of low solubility in water. The compounds have been found to be useful as parasiticides and are adapted to be employed as active constituents of compositions for the control of many bacterial, fungal and insect pests such as mites and aphids.

The new compounds may be prepared by mixing or blending lead tetraacetate with an O, O, O', O'-tetraalkyl p-phenylene - bis - (phosphoroamidothioate) corresponding to the formula

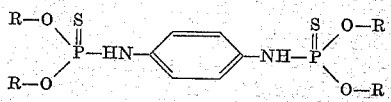

During such mixing, a dehydrogenation reaction takes place whereby the amido-hydrogen atoms are removed from the p-phenylene-bis(phosphoroamidothioate) reactant and the unsaturation of its phenylene bridge is changed to that of a quinoid structure. The contacting of the reactants is carried out in an inert organic reaction medium such as chloroform, benzene, toluene or xylene. The reaction between the lead tetraacetate and p - phenylene - bis(phosphoroamidothioate) reactant is somewhat exothermic and takes place smoothly at temperatures of from —10° to 50° C. The temperature may be controlled by regulating the rate of contacting the reactants and by external cooling.

In carrying out the reaction, the reactants are mixed and blended together in the reaction medium. The mixing and blending is carried out over a period of about an hour and at a temperature of from —10° to 50° C. Upon completion of the reaction, the reaction mixture is filtered to remove lead salts and the filtrate successively washed with dilute aqueous alkali metal salt such as aqueous sodium bicarbonate and with water. The washed filtrate is then concentrated by evaporation of the reaction medium or by fractional distillation under reduced pressure. During or following the latter operation, the desired product may precipitate in the concentrated mixture as a crystalline solid. Following the removal of a greater proportion of the solvent, the mixture may be cooled to precipitate the product or to precipitate further product. In an alternative procedure, the concentrated mixture is diluted with a non-polar solvent such as cyclohexane to precipitate the desired product. In either event, the desired product may be separated by filtration and thereafter purified by conventional procedures.

The following examples illustrate the invention but are not to be construed as limiting.

*Example 1.—N,N'-bis(dimethoxyphosphinothioyl)-p-benzoquine diimine*

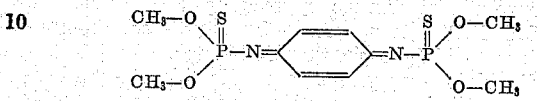

Lead tetraacetate (41 grams; 0.0928 mole) was added portionwise with stirring to 30 grams (0.0831 mole) of O,O,O',O'-tetramethyl p - phenylene - bis(phosphoroamidothioate) (melting at 156° C.) dissolved in 450 milliliters of chloroform. The addition was carried out over a period of about 15 minutes with cooling and at a temperature of about 0° C. The reaction mixture was then set aside at room temperature for 45 minutes with occasional stirring to complete the reaction. Upon completion of the reaction, the reaction mixture was filtered to remove lead salts and the filtrate successively washed with aqueous sodium carbonate and water. The filtrate was then dried over anhydrous magnesium sulfate and thereafter concentrated by evaporation of solvent to about one-fourth the original volume. The concentrated filtrate was diluted with cyclohexane. During the dilution, an N,N'-bis(dimethoxyphosphinothioyl)-p-benzoquinone diimine product precipitated in the mixture as a crystalline solid. This product was separated by filtration and found to melt at 127°–128° C., and have carbon, hydrogen and nitrogen contents of 34.46, 4.37 and 7.8 as compared to theoretical contents of 33.89, 4.55 and 7.91, respectively. The product was also found to have an infra-red spectrum corresponding to the indicated structure.

*Example 2.—2 - chloro-N,N' - bis(dimethoxyphosphinothioyl) - p - benzoquinone diimine*

Lead tetraacetate (14.6 grams; 0.033 mole) was added portionwise with stirring to 12.3 grams (0.0315 mole) of O,O,O',O'-tetramethyl (2-chloro-p-phenylene)-bis(phosphoroamidothioate) (melting at 135°–136° C.) dissolved in 300 milliliters of chloroform. The addition was carried out over a period of about 15 minutes and at a temperature of about 25° C. The reaction mixture was thereafter set aside at room temperature for 17 hours and thereafter filtered and the filtrate concentrated by evaporation of reaction medium to about one fourth the original volume. The concentrated filtrate was then diluted with cyclohexane and the diluted mixture decolorized with charcoal and cooled. During the cooling a 2 - chloro - N,N'-bis(dimethoxyphosphinothioyl) - p-benzoquinone diimine product precipitated as a crystalline solid. This product was crystallized from cyclohexane and found to melt at 128°–129° C., and to have an infra-red spectrum corresponding to the indicated structure.

In a similar manner, other N,N'-bis(dialkoxyphosphinothioyl)-p-benzoquinone diimine compounds may be prepared as follows:

N,N' - bis(di - n - butoxyphosphinothioyl) - p - benzoquinone diimine by reacting lead tetraacetate with O,O,O',O' - tetra - n - butyl p - phenylene - bis(phosphoroamidothioate).

N,N' - bis(ethoxymethoxyphosphinothioyl) - p - benzoquinone diimine by reacting lead tetraacetate with O,O' - diethyl - O,O' - dimethyl p - phenylene - bis(phosphoroamidothioate).

2 - chloro - N,N' - bis(diethoxyphosphinothioyl) - p - benzoquinone diimine by reacting lead tetraacetate with O,O,O',O' - tetraethyl (2 - chloro - p - phenylene) - bis(phosphoroamidothioate).

2 - chloro - N,N' - bis(diisopropoxyphosphinothioyl)-p - benzoquinone diimine by reacting lead tetraacetate with O,O,O',O' - tetraisopropyl (2 - chloro - p - phenylene) - bis(phosphoroamidothioate).

N,N' - bis(methoxyisopropoxyphosphinothioyl) - p - benzoquinone diimine by reacting lead tetraacetate with O,O' - dimethyl - O,O' - diisopropyl p - phenylene - bis(phosphoroamidothioate).

2 - chloro-N,N' - bis(di - sec. - butoxyphosphinothioyl)-p - benzoquinone diimine by reacting lead tetraacetate with O,O,O',O' - tetra - sec. - butyl (2 - chloro - p - phenylene) - bis(phosphoroamidothioate).

N,N' - bis(di - n - propoxyphosphinothioyl) - p - benzoquinone diimine by reacting lead tetraacetate with O,O,O',O' - tetra - n - propyl p - phenylene - bis(phosphoroamidothioate).

The new N,N' - bis(dialkoxyphosphinothioyl) - p - benzoquinone diimine products have been tested and found useful as parasiticides. For such use, the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents in oil-in-water emulsions or water dispersions with or without the addition of wetting, dispersing or emulsifying agents. In representative operations, aqueous compositions containing 1200 parts by weight of N,N'-bis(dimethoxyphosphinothioyl) - p - benzoquinone diimine give complete controls of two spotted spider mites, Mexican bean beetles, bean aphids and southern army worms.

The O,O,O',O'-tetraalkyl (2-chloro-p-phenylene)-bis(phosphoroamidothioates) employed as starting materials in accordance with the present invention may be prepared by mixing a suitable N,N'-bis(dialkoxyphosphinothioyl) - p - benzoquinone diimine with hydrogen chloride to effect a reaction whereby hydrogen chloride is added to the ring of the p-benzoquinone diimine reactant and the unsaturation of the quinoid bridge changed to a phenylene structure. The reaction is carried out in an inert solvent such as chloroform as reaction medium and takes place readily at temperatures of from 20° to 50° C. In carrying out the reaction, at least one molecular proportion of gaseous hydrogen chloride is passed into one molecular proportion of the N,N'-bis(dialkoxyphosphinothioyl)-p-benzoquinone diimine dispersed in the reaction solvent. Upon completion of the reaction, the reaction mixture is concentrated by evaporation of reaction medium and thereafter diluted with an organic solvent such as cyclohexane. During the dilution, the desired O,O,O',O'-tetraalkyl (2-chloro-p-phenylene)-bis(phosphoroamidothioate) may precipitate in the reaction mixture as crystalline solid. Following the dilution, the reaction mixture may be cooled to precipitate the desired product or further product which may be separated by filtration and further purified by known methods.

The O,O,O',O'-tetraalkyl p-phenylene-bis(phosphoroamidothioates) employed as starting materials in accordance with the teachings of the present invention may be prepared by mixing and blending about two molecular proportions of a suitable O,O-dialkyl phosphorochloridothioate with one molecular proportion p-phenylenediamine in the presence of about two molecular proportions of a neutralizing agent such as an alkali metal hydroxide. The reaction is carried out in an inert organic solvent such as dioxane as reaction medium and takes place smoothly at temperatures of from 0° to 90° C. with the production of the desired product and hydrogen chloride of reaction. This hydrogen chloride appears in the reaction mixture as alkali metal chloride and water. Upon completion of the reaction, the reaction mixture may be neutralized and diluted with ice-water to precipitate the desired product as a crystalline solid. This product may be separated by filtration and purified by conventional methods.

I claim:

1. A compound corresponding to the formula

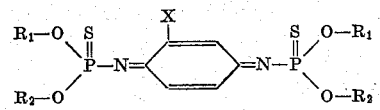

wherein $R_1$ and $R_2$ each represent a lower alkyl radical and X represents a member of the group consisting of hydrogen and chlorine.

2. N,N' - bis(dimethoxyphosphinothioyl) - p - benzonquinone diimine.

3. 2 - chloro - N,N' - bis(dimethoxyphosphinothioyl) - p - benzoquinone diimine.

4. N,N' - bis(diethoxyphosphinothioyl) - p - benzoquinone diimine.

No references cited.